US012535890B2

(12) United States Patent
Suzuki

(10) Patent No.: US 12,535,890 B2
(45) Date of Patent: Jan. 27, 2026

(54) INFORMATION PROCESSING APPARATUS, PROCESSING SYSTEM, AND NON-TRANSITORY COMPUTER READABLE MEDIUM STORING PROGRAM TO IMPROVE OPERABILITY OF INPUT OPERATION ON OBJECT

(71) Applicant: FUJIFILM Business Innovation Corp., Tokyo (JP)

(72) Inventor: Kenji Suzuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 700 days.

(21) Appl. No.: 17/666,472

(22) Filed: Feb. 7, 2022

(65) Prior Publication Data

US 2023/0095811 A1    Mar. 30, 2023

(30) Foreign Application Priority Data

Sep. 27, 2021    (JP) ................................. 2021-157001

(51) Int. Cl.
     *G06F 3/01*      (2006.01)
     *G02B 27/01*      (2006.01)
     *G06T 19/00*      (2011.01)

(52) U.S. Cl.
     CPC ......... *G06F 3/017* (2013.01); *G02B 27/0172* (2013.01); *G06F 3/011* (2013.01); *G06T 19/006* (2013.01)

(58) Field of Classification Search
CPC .. G06F 3/017; G06F 3/011; G06F 2203/0384; G02B 27/0172; G06T 19/006; H04M 1/72412
See application file for complete search history.

(56) References Cited

U.S. PATENT DOCUMENTS

| | | | |
|---|---|---|---|
| 9,699,291 | B2 | 7/2017 | Zhao et al. |
| 2015/0227222 | A1* | 8/2015 | Sako ................. G02B 27/017 345/173 |
| 2018/0260033 | A1* | 9/2018 | Norieda ............ G06F 3/014 |
| 2021/0011556 | A1 | 1/2021 | Atlas et al. |
| 2021/0333864 | A1* | 10/2021 | Harvey .............. G06T 19/006 |

FOREIGN PATENT DOCUMENTS

| | | |
|---|---|---|
| JP | 6346585 | 6/2018 |
| JP | 6591527 | 10/2019 |

OTHER PUBLICATIONS

"Office Action of Japan Counterpart Application", issued on May 20, 2025, with English translation thereof, pp. 1-5.

* cited by examiner

*Primary Examiner* — Phuong H Nguyen
(74) *Attorney, Agent, or Firm* — JCIPRNET

(57) ABSTRACT

An information processing apparatus includes a processor configured to perform control for causing an object and an input apparatus that are capable of receiving an information input operation to be visible through a display device, detect contact between the object and the input apparatus, based on information regarding respective positions of the object and the input apparatus that are visible through the display device, and receive information input to the input apparatus, as information input to the object, in a case where the contact is detected.

19 Claims, 12 Drawing Sheets

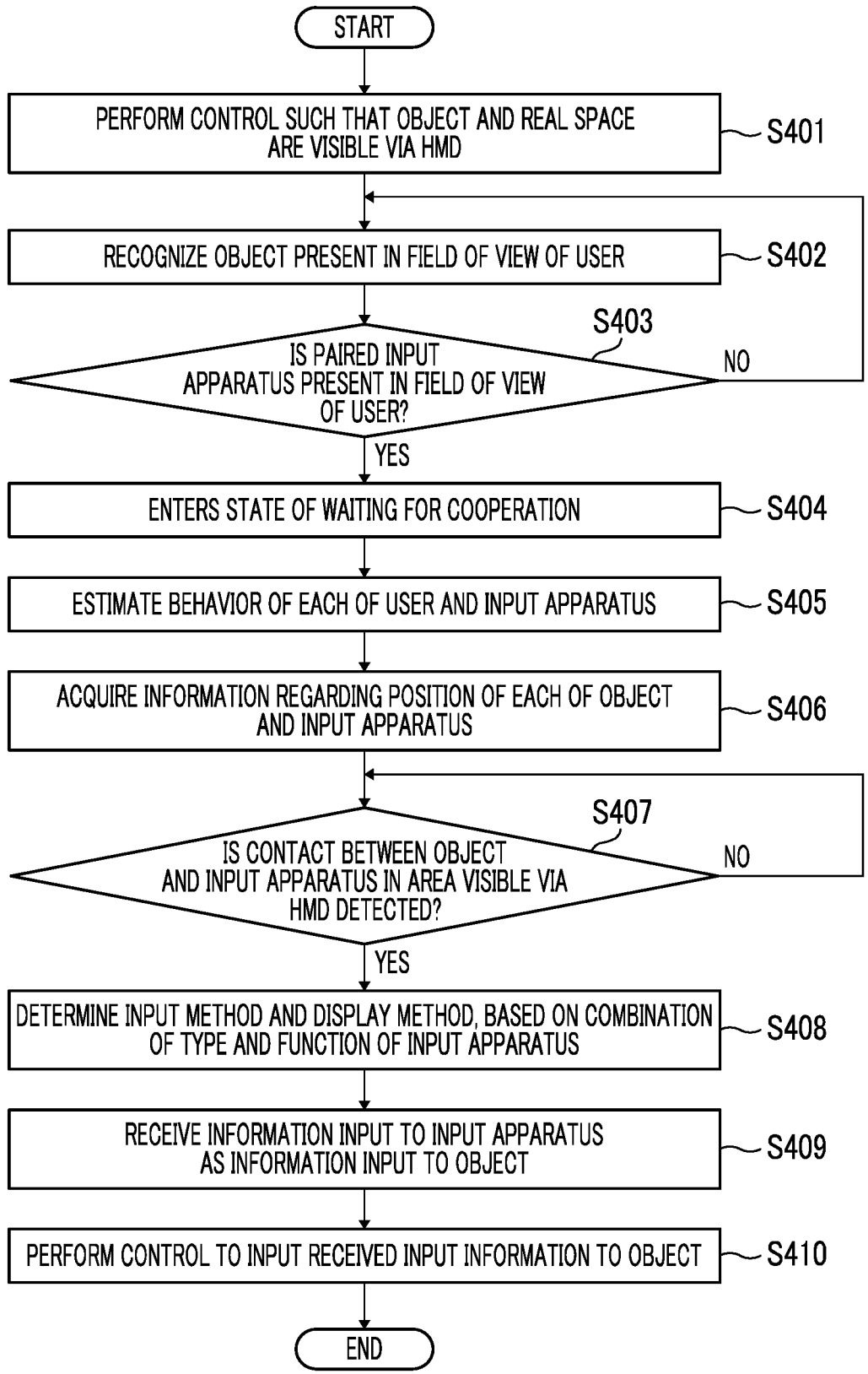

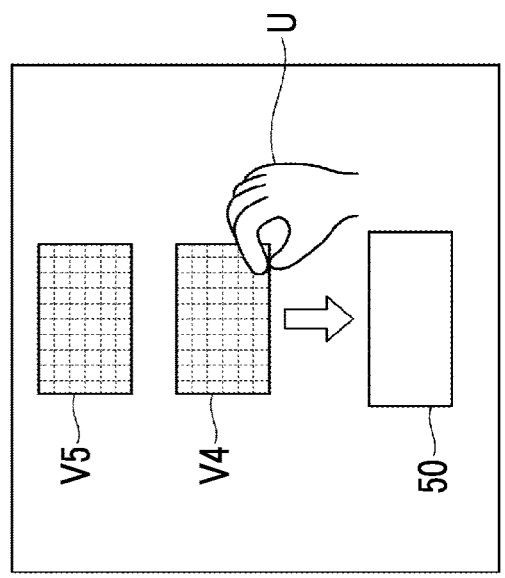
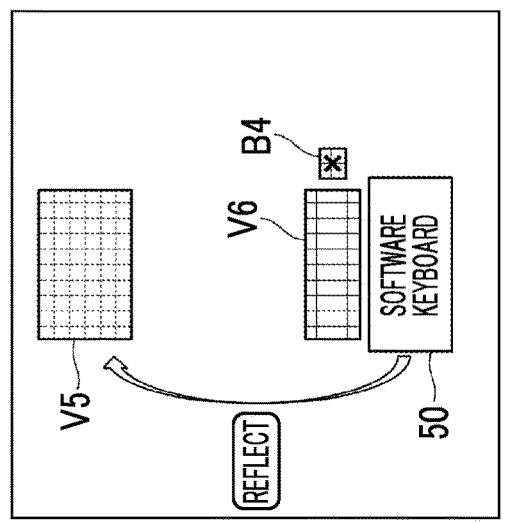
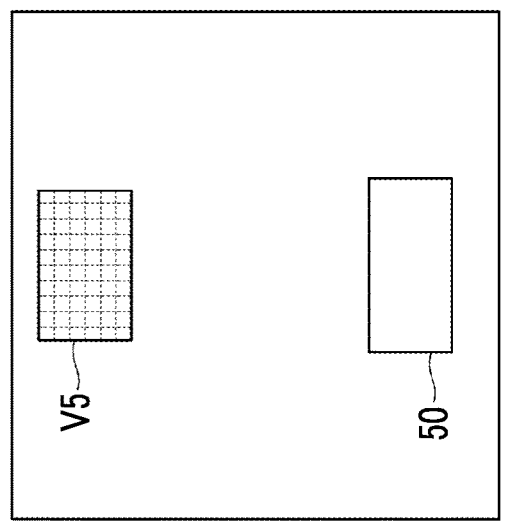

INFORMATION PROCESSING APPARATUS, PROCESSING SYSTEM, AND NON-TRANSITORY COMPUTER READABLE MEDIUM STORING PROGRAM TO IMPROVE OPERABILITY OF INPUT OPERATION ON OBJECT

CROSS-REFERENCE TO RELATED APPLICATIONS

This application is based on and claims priority under 35 USC 119 from Japanese Patent Application No. 2021-157001 filed Sep. 27, 2021.

BACKGROUND (i) Technical Field

The present invention relates to an information processing apparatus, an information processing system, and a non-transitory computer readable medium storing a program.

(ii) Related Art

For example, the Augmented Reality (AR) and Virtual Reality (VR) techniques of operating objects displayed on display devices such as head-mounted displays (HMDs) by gesture have an advantage in that the 3D model can be browsed by intuitive operations. For example, JP6346585B discloses a technique that enables a user wearing an HMD to perform an input operation such as tapping or pinching while superimposing a smartphone on each of one or more virtual objects by gesture.

SUMMARY

However, many users feel that it is more difficult to perform an input operation on the object displayed on an HMD by gesture as compared to a case of performing an input operation on a general-purpose device such as a personal computer, a smartphone, or a tablet.

Aspects of non-limiting embodiments of the present disclosure relate to an information processing apparatus, an information processing system, and a non-transitory computer readable medium storing a program that the operability of an input operation on an object that is visible through a display device is improved as compared to a case of performing an input operation by a gesture.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to perform control for causing an object and an input apparatus that are capable of receiving an information input operation to be visible through a display device, detect contact between the object and the input apparatus, based on information regarding respective positions of the object and the input apparatus that are visible through the display device, and receive information input to the input apparatus, as information input to the object, in a case where the contact is detected.

BRIEF DESCRIPTION OF THE DRAWINGS

Exemplary embodiment(s) of the present invention will be described in detail based on the following figures, wherein:

FIG. 5 is a flowchart illustrating a flow of a process by the HMD;

FIGS. 9A to 9C are diagrams illustrating an example of a case where the object is a software keyboard and the input apparatus is a tablet terminal, as the specific example of the object and the input apparatus that are visible to the user through the HMD;

DETAILED DESCRIPTION

Configuration of Information Processing System

Hereinafter, an exemplary embodiment of the present invention will be described in detail with reference to the accompanying drawings.

Figure 1:
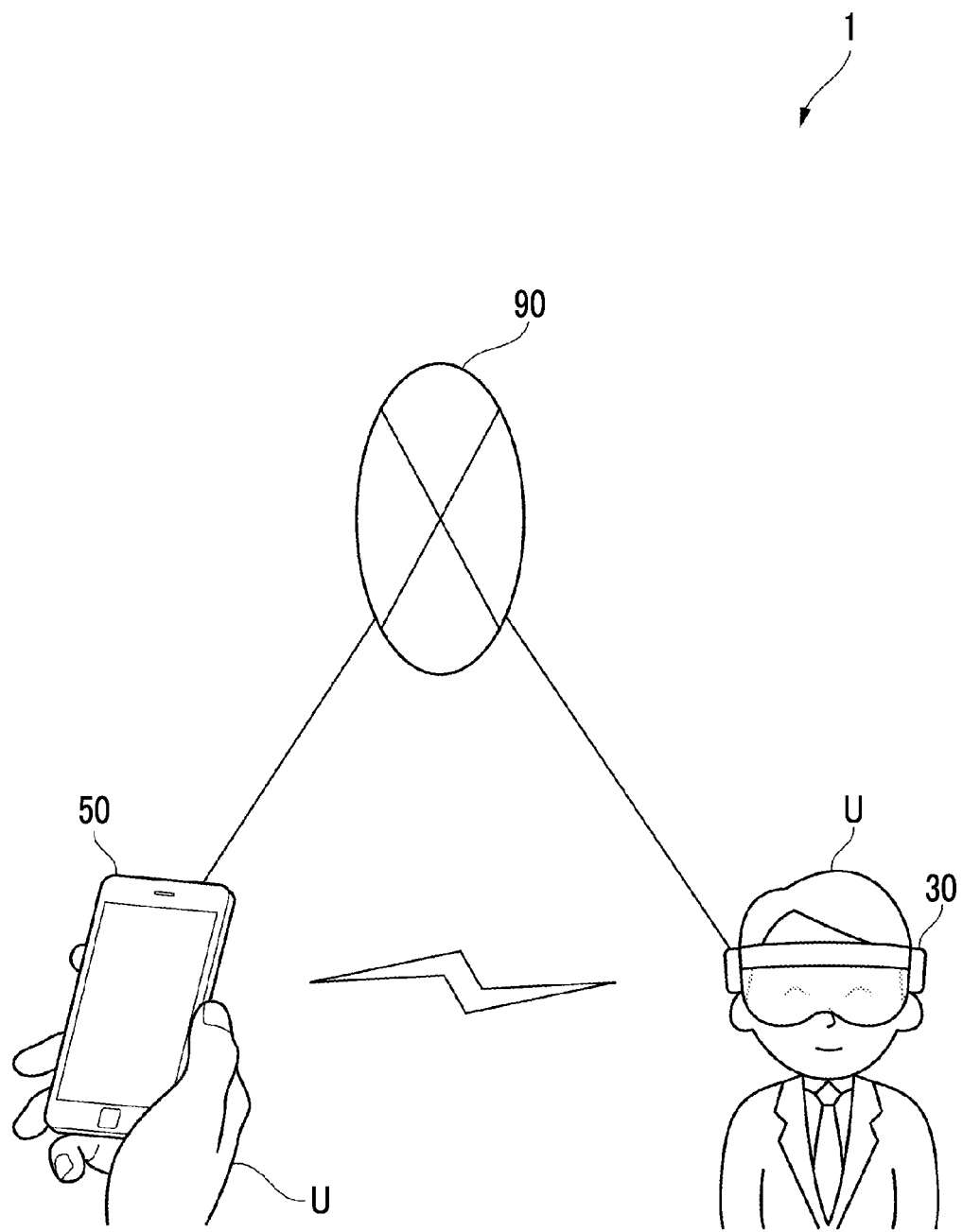
FIG. 1 is a diagram illustrating an overall configuration of an information processing system to which the present exemplary embodiment is applied.

FIG. 1 is a diagram illustrating an overall configuration of an information processing system 1 to which the present exemplary embodiment is applied.

In the information processing system 1, a head-mounted display (HMD) 30 having an information processing function and an input apparatus 50 are connected through a network 90, or according to a communication scheme such as infrared communication, visible light communication, proximity wireless communication, Bluetooth (registered trademark), RFID (registered trademark), or an Ultra Wide Band (UWB). The network 90 is, for example, a local area network (LAN), the Internet, or the like.

The HMD 30 performs control to display an object and to make the input apparatus 50 present in a real space visible to a user U. Further, the HMD 30 detects the contact between the displayed object and the visible input apparatus 50. Then, in a case where the contact between the object and the input apparatus 50 is based on the intentional operation of the user U, the HMD 30 makes the object and the input apparatus 50 cooperate with each other, and then receives information that is input to the input apparatus 50 as the information that is input to the object.

The HMD 30 is a head-mounted information processing apparatus having a display that displays image information. As the HMD 30, there are a transparent type and a non-transparent type. The transparent HMD 30 displays the object on the display and makes the input apparatus 50 present in the real space visible through the display. The non-transparent HMD 30 displays the object and the input apparatus 50 on the display in real time.

The user U wearing the transparent HMD 30 can simultaneously visually recognize the object displayed on the HMD 30 and the input apparatus 50 present in the real space through the HMD 30. Further, the user U wearing the non-transparent HMD 30 can simultaneously visually recognize the object displayed on the HMD 30 and the input apparatus 50. In the present exemplary embodiment, the transparent HMD 30 is adopted. Examples of the object displayed on the HMD 30 include document data, a whiteboard, a virtual keyboard, a three-dimensional model, an image, a moving image, an audio file, and the like.

The input apparatus 50 is an information processing apparatus that is present in the real space together with the user U and has a function of receiving an input operation of the user U. Examples of the input apparatus 50 include a smartphone, a personal computer (desktop type, notebook type), a tablet terminal, a so-called touch sensor, a pen tablet, an electronic pen, a smart pen, and the like.

Hardware Configuration of HMD

Figure 2:
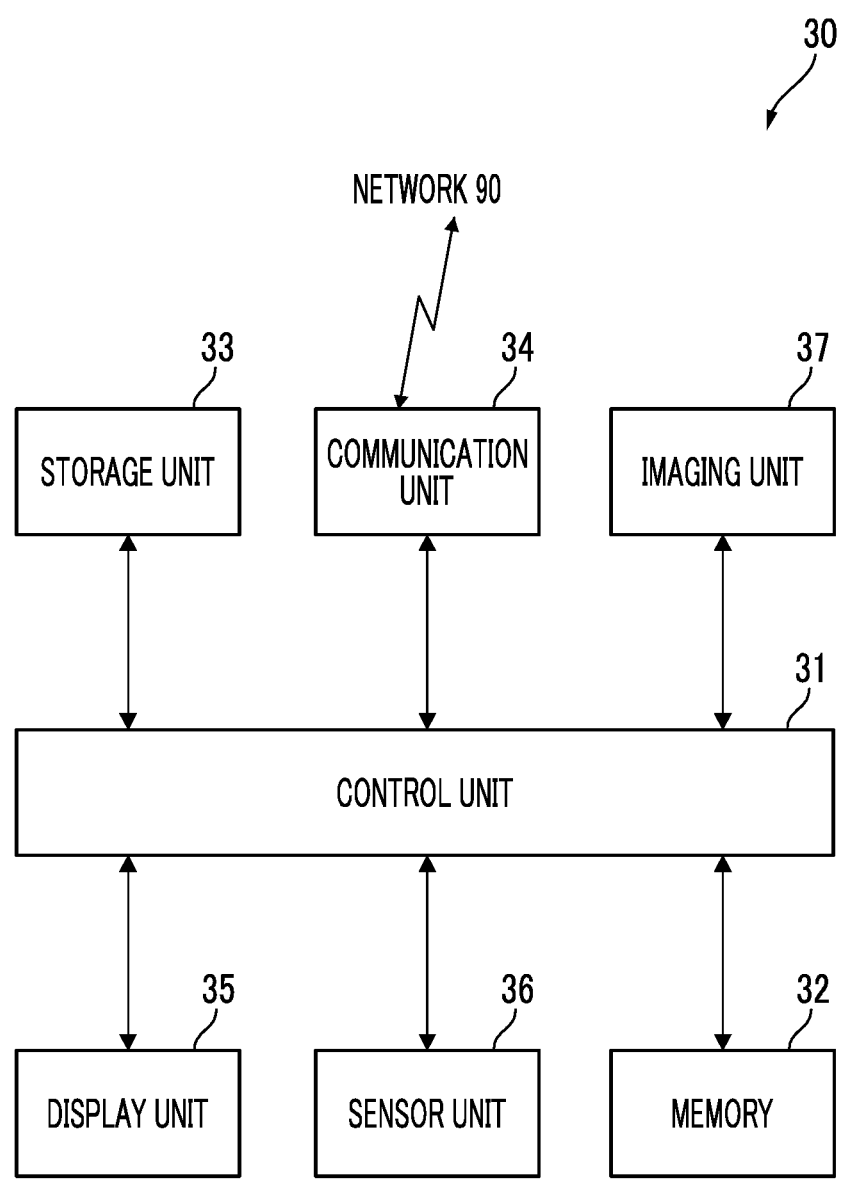
FIG. 2 is a diagram illustrating a hardware configuration of an HMD.

FIG. 2 is a diagram illustrating a hardware configuration of the HMD 30.

The HMD 30 includes a control unit 31, a memory 32, a storage unit 33, a communication unit 34, a display unit 35, a sensor unit 36, and an imaging unit 37. Each of these units is connected by a data bus, an address bus, a Peripheral Component Interconnect (PCI) bus, or the like.

The control unit 31 is a processor that controls the operation of the HMD 30 by executing various types of software such as OS (basic software) and application software. The control unit 31 is, for example, a central processing unit (CPU). The memory 32 is a storage area for storing various types of software, data used for executing the software, and the like, and is used as a work area for calculation. The memory 32 is, for example, a Random Access Memory (RAM) or the like.

The storage unit 33 is a storage area for storing input data for various types of software, output data from various types of software, and the like, and stores a database for storing various types of information. The storage unit 33 is composed of, for example, a Hard Disk Drive (HDD), a Solid State Drive (SSD), a semiconductor memory, or the like used for storing programs, various types of setting data, and the like. The communication unit 34 transmits or receives data through the network 90 or by a communication scheme such as infrared communication. The communication unit 34 transmits and receives data to and from the input apparatus 50 and the outside.

The display unit 35 presents an image to the user through a liquid crystal display or an organic EL display, and there are a non-transparent type like a normal display and a transparent type in which the user can visually recognize the front through the display. Usually, the former is called a virtual reality HMD (VR-HMD), and the latter is called an augmented reality HMD (AR-HMD) or a mixed reality HMD (MR-HMD).

The sensor unit 36 is composed of various sensors such as an optical sensor such as a Laser Imaging Detection and Ranging (LiDAR) sensor and an acceleration sensor. The imaging unit 37 is composed of a camera or the like. Each of these units is connected by a data bus, an address bus, a PCI bus, or the like.

Hardware Configuration of Input Apparatus

The hardware configuration of the input apparatus 50 differs depending on the type of the input apparatus 50. For example, in a case where the input apparatus 50 is a smartphone, a personal computer (desktop type, notebook type), or a tablet terminal, the hardware configuration has an operation unit in addition to the hardware configuration of the HMD 30 illustrated in FIG. 2. The operation unit is composed of, for example, a keyboard, a mouse, mechanical buttons, and switches, and receives input operations. The operation unit also includes a touch sensor that integrally configures a touch panel with the display unit. Further, for example, in a case where the input apparatus 50 does not have a screen such as a so-called touch sensor, pen tablet, electronic pen, or smart pen, the input apparatus 50 has the same configuration as the hardware configurations of the HMD 30 illustrated in FIG. 2, other than the display unit 35.

Functional Configuration of Control Unit of HMD

Figure 3:
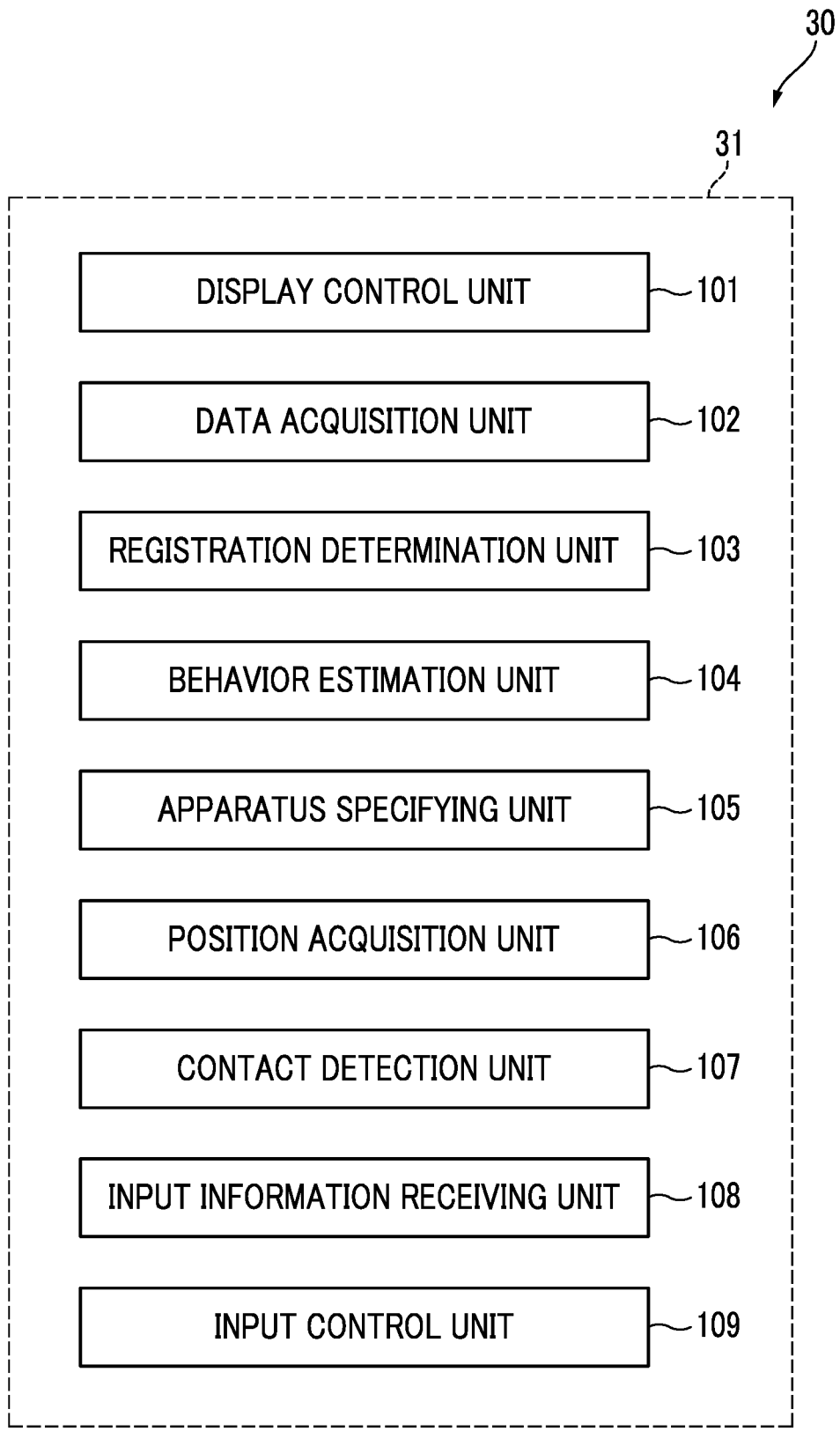
FIG. 3 is a diagram illustrating a functional configuration of a control unit of the HMD.

FIG. 3 is a diagram illustrating a functional configuration of the control unit 31 of the HMD 30.

In the control unit 31 of the HMD 30, a display control unit 101, a data acquisition unit 102, a registration determination unit 103, a behavior estimation unit 104, an apparatus specifying unit 105, a position acquisition unit 106, a contact detection unit 107, an input information receiving unit 108, and an input control unit 109 function.

The display control unit 101 controls the object and the input apparatus 50 which are capable of receiving the information input operation to be visible through the HMD 30. Specifically, the display control unit 101 performs control for causing the object capable of receiving the information input operation to be displayed on the display unit 35, and the input apparatus 50 present in the real space to be visible through the display unit 35.

The data acquisition unit 102 acquires the sensing data of various sensors of the sensor unit 36 and the data of the image (still image and moving image) captured by the imaging unit 37. The sensing data of various sensors of the sensor unit 36 includes sensing data relating to the movements of both hands and the movements of the eyes of the user U. Further, the data of the image captured by the imaging unit 37 includes data of the image obtained by capturing the user U, and data of images obtained by capturing the object and the input apparatus 50 present in the area visible through the display unit 35.

The registration determination unit 103 determines the registration states of candidates for cooperation destination between the HMD 30 and the input apparatus 50. The "registration states of candidates for cooperation destination" refers to states indicating whether or not a plurality of devices are registered as candidates for cooperation destinations of each other and are waiting for cooperation. Such a state is also called a so-called "pairing" state. Once paired, pairing is not required for the second and subsequent connections. The registration determination unit 103 determines whether or not the HMD 30 and the input apparatus 50 are paired and are waiting for cooperation, based on the information possessed by the HMD 30 and the information obtained from each of the input apparatuses 50.

Here, the pairing of the HMD 30 and the input apparatus 50 will be described. The pairing of the HMD 30 and the input apparatus 50 is performed by, for example, the following procedure. That is, the pairing process may be started by the voice input of the user U. In this case, for example, in a case where the user utters "pairing", the voice may be detected and the voice guidance regarding the pairing may be output from the HMD 30. Further, for example, a guide such as "Please press the pairing start button in the application software of the device to be paired" may be output from the HMD 30, and the application software for connection pre-installed in the input apparatus 50 may be started to perform pairing process.

In this case, any input apparatus 50 in which the application software for connection is installed may be in an open connection environment in which the pairing process is started. Further, in a case where the user U wearing the HMD 30 on the head visually recognizes the QR code (registered trademark) displayed on the input apparatus 50 through the HMD 30, the HMD 30 detects the QR code (registered trademark) and the pairing process may be started automatically. Further, from the viewpoint of preventing unintended pairing with the input apparatus 50, the input apparatus 50 to which the HMD 30 can be paired may be limited to be in a closed connection environment in which the HMD 30 is paired in advance.

The behavior estimation unit 104 estimates the behavior of each of the user U and the input apparatus 50, based on the data acquired by the data acquisition unit 102 and the data provided by the input apparatus 50. Of the behaviors, the behavior of the user U refers to the movements of both hands and the movements of the eyes of the user U. The behavior of the input apparatus 50 refers to the movement of the input apparatus 50 in the real space. Examples of the data acquired by the data acquisition unit 102 include data indicating the state of pairing with the input apparatus 50, sensing data of various sensors of the sensor unit 36, data of images (still images and moving images) captured by the imaging unit 37, or the like.

Further, the data provided from the input apparatus 50 includes data indicating the paired state with the HMD 30, data input to the input apparatus 50, inertial measurement data (IMU data) of the input apparatus 50, three-dimensional behavior data of the input apparatus 50, data regarding the position of the input apparatus 50, and the like. Specifically, for example, the behavior estimation unit 104 estimates the behavior of the input apparatus 50 from the collation result between the inertial measurement data (IMU data) of the input apparatus 50 and the three-dimensional behavior data.

The method of acquiring the three-dimensional data of the outer shape of the input apparatus 50 is not particularly limited. For example, the data may be acquired separately based on the type of the input apparatus stored in advance in the database of the storage unit 13. Further, for example, the user U wearing the HMD 30 looks at the input apparatus 50 from all directions, and at the same time, the HMD 30 generates three-dimensional data from the data of a plurality of captured images obtained by imaging the input apparatus 50. In this case, voice guidance regarding the procedure for viewing the input apparatus 50 may be output from the HMD 30 toward the user U.

The apparatus specifying unit 105 specifies the input apparatus 50 to be the target of the input operation of the user U, based on the data acquired by the data acquisition unit 102, the data provided by the input apparatus 50, the estimation result by the behavior estimation unit 104, and a combination of the type and the function of input apparatus stored in advance in the database of the storage unit 13. The specification of the input apparatus 50 includes the specification of the function of the input apparatus 50. Examples of the data acquired by the data acquisition unit 102 include sensing data and image data. Examples of the data provided from the input apparatus 50 include data indicating the paired state, input data, inertial measurement data (IMU data), three-dimensional behavior data, data regarding the position, and the like. Specifically, for example, the apparatus specifying unit 105 specifies the input apparatus 50 based on the data of the image showing the area visible to the user U through the HMD 30, among the data pieces acquired by the data acquisition unit 102.

The position acquisition unit 106 acquires information regarding the positions of the object and the input apparatus 50 in the area visible to the user U through the HMD 30. Specifically, the position acquisition unit 106 acquires information regarding the respective positions of the object and the input apparatus 50 in the area visible to the user U through the display unit 35, from the data of the image showing the area visible to the user U through the display unit 35, among the data pieces of the image acquired by the data acquisition unit 102.

The contact detection unit 107 detects the contact between the object and the input apparatus 50. Specifically, the contact detection unit 107 detects contact between the object in an area visible through the display unit 35 and the input apparatus 50, based on the information regarding respective positions of the object and the input apparatus 50, acquired by the position acquisition unit 106. The contact between the object and the input apparatus 50 may be in a case where the outer edges of the object and the input apparatus 50 are in contact with each other, or the outer edges of the virtual areas each surrounding the outer edges of the input apparatus 50 and the object may be in contact with each other. In this case, the "virtual area surrounding the outer edge" is specified based on a predetermined value as the value of the distance from the outer edge of each of the object and the input apparatus 50 to the outside.

Further, the contact detection unit 107 detects whether or not the contact between the object and the input apparatus 50 is based on the intentional operation of the user U. In a case where the contact detection unit 107 detects the contact between the object and the input apparatus 50 and the contact is based on the intentional operation of the user U, the object and the input apparatus 50 enter a cooperative state. For example, in a case where the gesture of the user U wearing the HMD 30 is to grab the object displayed on the HMD 30 and bring the object into contact with the input apparatus 50, the contact detection unit 107 detects that the contact is based on the intentional operation of the user U. Further, for example, in a case where it is detected that the position of the line of sight of the user U at the timing when the object and the input apparatus 50 come into contact with each other is at or near the contact point between the object and the input apparatus 50, the contact detection unit 107 may detect that the contact between the object and the input apparatus 50 is based on the intentional operation of the user U.

Further, in a case of detecting the contact between the object and the input apparatus 50, the contact detection unit 107 detects the state of the object. In a case where the object detected by the contact detection unit 107 is in a state where input cannot be performed due to write-protection measures, or in a case where input to the object cannot be performed by the input function of the paired input apparatus 50, even in a case where the object comes into contact with the input apparatus 50, the object is repelled without cooperation. Thus, the user U can intuitively know that the object is write-protected. Further, for example, by displaying a color or a pop-up message indicating that the input to the object cannot be performed on the HMD 30, outputting by voice, or generating vibration, the user U may recognize visually, audibly, and tactilely that the input to the object cannot be performed.

Further, the contact detection unit 107 further detects the separation between the object and the input apparatus which are in contact with each other, based on the information regarding the respective positions of the object and the input apparatus. Thus, the cooperation between the object and the input apparatus 50 is released. Further, the contact detection unit 107 detects whether or not the separation between the object and the input apparatus 50 which are in contact with each other is based on the intentional operation of the user U. In a case where the contact detection unit 107 detects the separation between the object and the input apparatus 50 and the separation is based on the intentional operation of the user U, the cooperation between the object and the input apparatus 50 is released.

For example, in a case where the gesture of the user U wearing the HMD 30 is to grab the object that is visible through the HMD 30 and separate the object from the input apparatus 50, the contact detection unit 107 detects that the separation between the object and the input apparatus 50 is based on the intentional operation of the user U. Further, for example, in a case where it is detected that the position of the line of sight of the user U at the timing when the object and the input apparatus 50 are separated from each other is at or near the contact point between the object and the input apparatus 50, the contact detection unit 107 may detect that the separation between the object and the input apparatus 50 is based on the intentional operation of the user U.

In a case where the contact detection unit 107 detects the contact between the object and the input apparatus 50, and the object and the input apparatus 50 cooperate with each other, the input information receiving unit 108 receives the information input to the input apparatus 50 as information input to the object. That is, once the object and the input apparatus 50 cooperate with each other, the user U can concentrate on the input operation without paying particular attention to the positional relationship between the object and the input apparatus 50.

Specifically, the input information receiving unit 108 receives, as the information input to the object, the information input by the input function for performing an input operation specified by a combination of the type of the object stored in the database of the storage unit 13 and the function of the input apparatus 50. Examples of the input function for performing an input operation include a touch panel, a smart pen, and the like, in a case where the input apparatus 50 is a smartphone or a tablet terminal. In a case where the input apparatus 50 is a personal computer, examples of the input function include a keyboard, a mouse, and the like.

Further, in case where the contact detection unit 107 detects the separation between the object and the input apparatus 50 which are in contact and cooperate with each other, and the cooperation between the object and the input apparatus 50 is released, the input information receiving unit 108 does not receive the information as information input to the object, even in a case where the information is input to the input apparatus 50. However, in a case where the contact detection unit 107 detects the separation between the object and the input apparatus 50, in a case where the separation is not due to the gesture of the user U, it is detected that the separation is not based on the intentional operation of the user U, and the cooperation between the object and the input apparatus 50 is continued without being released. Therefore, the information input to the input apparatus 50 is continuously received as the information input to the object.

The input control unit 109 performs control to input the input information received by the input information receiving unit 108 to the object. For example, in a case where the object is an electronic document capable of receiving text input and the input apparatus 50 is a tablet terminal, the control is performed to input the text information, input to the tablet terminal, to the electronic document. Further, for example, in a case where the object is a PDF document and the input apparatus 50 is a pen tablet, handwriting data, the control is performed to input drawing information, input to the pen tablet by the stylus, to the electronic document. Further, for example, in a case where the object is a three-dimensional model and the input apparatus 50 is a personal computer, the control is performed to reflect the information, input for editing the three-dimensional model, in the three-dimensional model.

Pairing Process

Figure 4A:
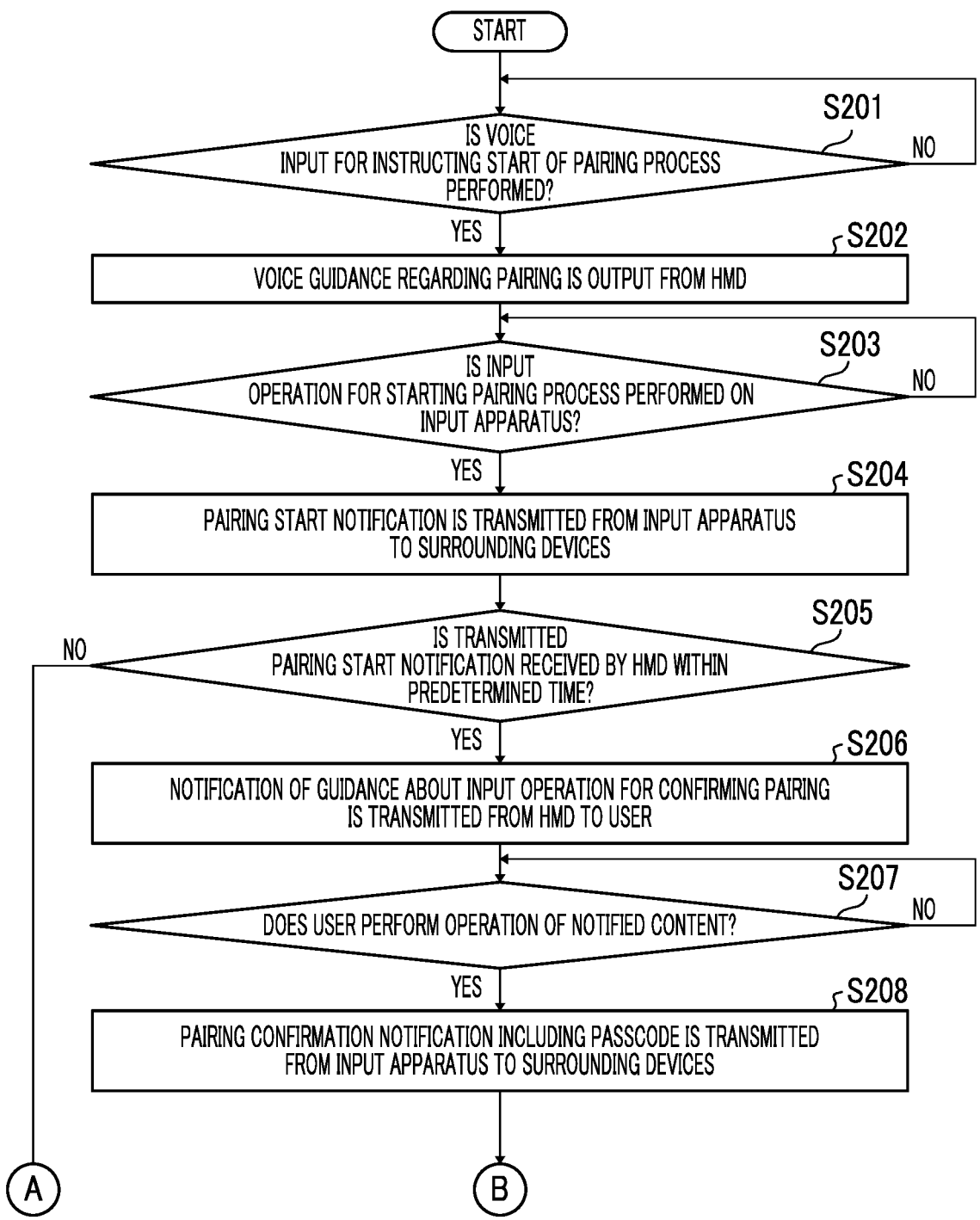
FIGS. 4A and 4B are a flowchart illustrating a flow of a pairing process.
Figure 4B:
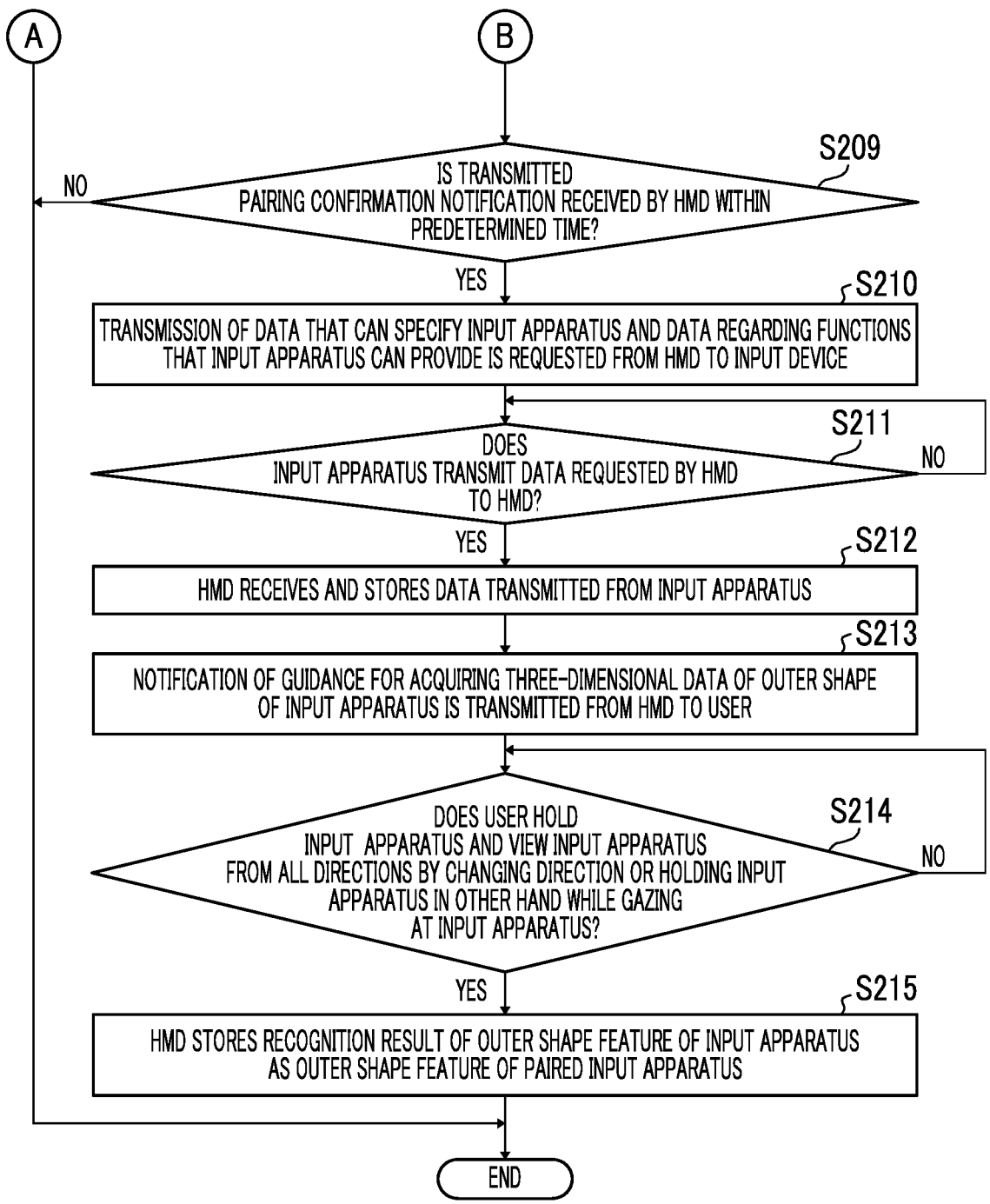

FIGS. 4A and 4B are a diagram illustrating a flow of a pairing process between the HMD 30 and the input apparatus 50. FIGS. 4A and 4B illustrate an example of the case where the pairing process is started by the voice input of the user, as an example of the pairing process.

In a case where in the state where the HMD 30 and the input apparatus 50 are not paired, the voice input for instructing the start of the pairing process is performed (YES in step S201), the voice guidance regarding the pairing is output from the HMD 30 (step S202). On the other hand, in a case where the voice input for instructing the start of the pairing process is not performed (NO in step S201), the process of step S201 is repeated until the voice input for instructing the start of the pairing process is performed.

In a case where an input operation for starting the pairing process is performed on the input apparatus 50 according to the guidance from the HMD 30 (YES in step S203), a pairing start notification is transmitted from the input apparatus 50 to the surrounding devices (step S204). On the other hand, in a case where the input operation for starting the pairing process is not performed on the input apparatus 50 (NO in step S203), the process of step S203 is repeated until the input operation for starting the pairing process is performed on the input apparatus 50.

In a case where the pairing start notification transmitted from the input apparatus 50 is received by the HMD 30 within a predetermined time (YES in step S205), a notification of guidance about the input operation for confirming the pairing is transmitted from the HMD 30 to the user U (step S206). For example, a notification of a guidance such as "Enter the passcode and press the pairing confirmation button" is presented. On the other hand, in a case where the transmitted pairing start notification is not received by the HMD 30 within a predetermined time (NO in step S205), the process ends without being paired.

Here, in a case where the user U performs the operation of the notified content (YES in step S207), a pairing confirmation notification including the passcode is transmitted from the input apparatus 50 to the surrounding devices (step S208). On the other hand, in a case where the user U does not perform the operation of the notified content (NO in step S207), the process of step S207 is repeated until the user U performs the operation of the notified content.

In a case where the transmitted pairing confirmation notification is received by the HMD 30 within a predetermined time (YES in step S209), the HMD 30 requests the input apparatus 50 to transmit the data that can specify the input apparatus 50 and data regarding the functions that the input apparatus 50 can provide (step S210). Examples of the data that can specify the input apparatus 50 include the Wi-Fi address of the input apparatus 50. On the other hand, in a case where the transmitted pairing confirmation notification is not received by the HMD 30 within a predetermined time (NO in step S209), the process ends without being paired.

In a case where the input apparatus 50 transmits the data requested by the HMD 30 to the HMD 30 (YES in step S211), the HMD 30 receives and stores the data transmitted from the input apparatus 50 (step S212). On the other hand, in a case where the input apparatus 50 does not transmit the data requested by the HMD 30 to the HMD 30 (NO in step S211), the process of step S211 is repeated until the input apparatus 50 transmits the data requested by the HMD 30 to the HMD 30.

Then, a notification of the guidance for acquiring the three-dimensional data of the outer shape of the input apparatus 50 is transmitted from the HMD 30 to the user U (step S213). For example, a notification of a voice guidance such as "Hold the device (input apparatus 50) in your hand and look at the device from various angles" is transmitted. Therefore, in a case where the user U holds the input apparatus 50 and views the input apparatus 50 from all directions by changing the direction or holding the input apparatus 50 in the other hand while gazing at the input apparatus 50 (YES in step S214), the HMD 30 stores the recognition result of the outer shape feature of the input apparatus 50 as the outer shape feature of the paired input apparatus 50 (step S215).

Specifically, the HMD 30 estimates the three-dimensional shape of the input apparatus 50 held by the user U from the vicinity of the point where the user U gazes, recognizes the feature of the outer shape of the input apparatus 50 from various angles, and stores the recognition result as the feature of the outer shape of the paired input apparatus 50. Thus, the HMD 30 and the input apparatus 50 are completely paired, and are waiting for cooperation. On the other hand, in a case where the user U does not perform an operation of holding the input apparatus 50 and viewing the input apparatus 50 from all directions by changing the direction or holding the input apparatus 50 in the other hand while gazing at the input apparatus 50 (NO in step S214), the process of step S214 is repeated until such an operation is performed.

Process by HMD

FIG. 5 is a flowchart illustrating the flow of a cooperation process by the HMD 30.

The HMD 30 performs control such that the object and the real space are visible through the HMD (step S401). Specifically, control is performed such that the display unit 35 of the HMD 30 displays the object. In the present exemplary embodiment, since the transparent HMD 30 is adopted, the input apparatus 50 is visible through the display unit 35.

The HMD 30 recognizes an object present in the field of view of the user, from the data of the image captured by the imaging unit 37 (step S402). Then, as a result of specifying the input apparatus 50, in a case where the paired input apparatus 50 is present in the field of view of the user U (YES in step S403), the HMD 30 and the input apparatus 50 are waiting for cooperation (step S404). The HMD 30 estimates the behavior of each of the user U and the input apparatus 50, based on the data acquired by the data acquisition unit 102 and the data acquired from each of the input apparatuses 50 (step S405). On the other hand, in a case there is no paired input apparatus in the field of view of the user (NO in step S403), the process returns to step S402.

The HMD 30 acquires information regarding the position of each of the object and the input apparatus 50, from the data of the image showing the area visible to the user U through the HMD 30 (step S406). In a case where the contact between the object and the input apparatus 50 in an area visible through the HMD 30 is detected based on the acquired information regarding the position of each of the object and the input apparatus 50 (YES in step S407), the HMD 30 determines the input method and the display method, based on the combination of the type and function of the input apparatus 50 stored in advance in the database of the storage unit 13 (step S408). Then, the HMD 30 receives the information input to the input apparatus 50 as the information input to the object (step S409), and performs control to input the received input information to the object (step S410). On the other hand, in a case where the contact between the object and the input apparatus 50 is not detected (NO in step S407), the HMD 30 repeats the process of step S407 until the contact between the object and the input apparatus 50 is detected.

Specific Examples

FIGS. 6A to 11C are diagrams illustrating specific examples of the object and the input apparatus 50 that are visible to the user U through the HMD 30. It is assumed that the HMD 30 and the input apparatus 50 are paired in advance.

Figure 6A:
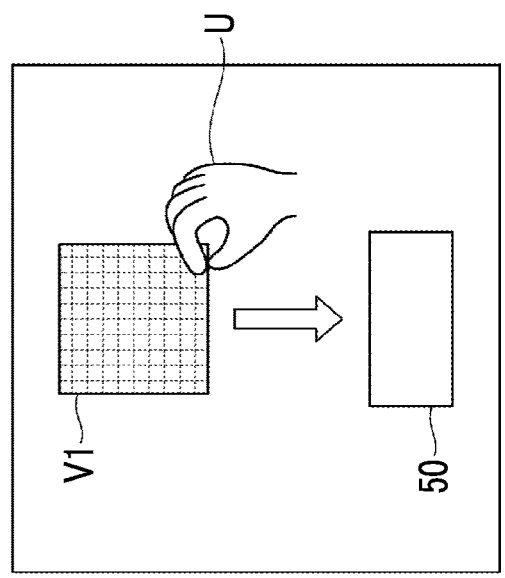
FIGS. 6A to 6C are diagrams illustrating an example of a case where the object is an electronic document capable of receiving text input and the input apparatus is a tablet terminal, as the specific example of the object and the input apparatus that are visible to the user through the HMD.
Figure 6B:
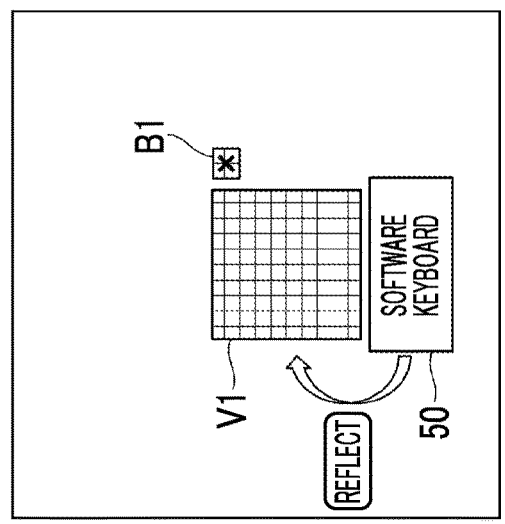
Figure 6C:
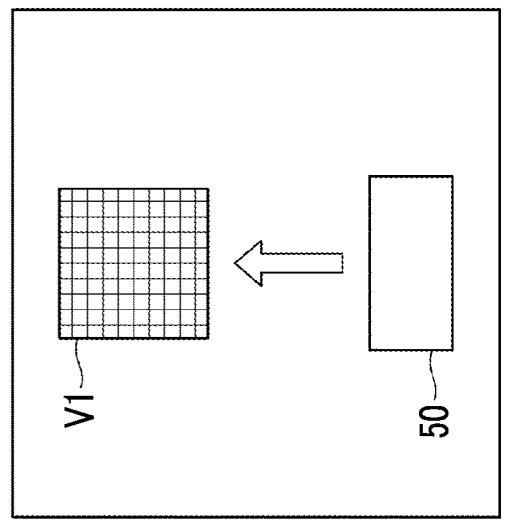

FIGS. 6A to 6C illustrate an example of a case where the object V1 visible through the HMD 30 is an electronic document capable of receiving text input and the input apparatus 50 is a tablet terminal. FIG. 6A illustrates a state in which the object V1 that is visible through the HMD 30 and the input apparatus 50 are separated from each other and do not cooperate with each other. Here, in a case where, as a gesture of the user U, the user U performs an operation of grasping the object V1 and moving the object V1 as it is to be brought into contact with the input apparatus 50, the contact between the object V1 and the input apparatus 50 is detected.

In a case where the contact between the object V1 and the input apparatus 50 is detected as a result of the gesture of the user U, as illustrated in FIG. 6B, the object V1 and the input apparatus 50 enter a state of being in contact with each other, that is, a cooperative state. Then, the software keyboard is displayed so as to be superimposed on the input apparatus 50 which is in a visible state through the HMD 30. Thus, the user U can perform an input operation on the displayed software keyboard.

Then, in a case where the user U performs an input operation on the input apparatus 50 present in the real space while looking at the software keyboard displayed on the HMD 30, the input operation is linked to the input operation of the software keyboard. Thus, the information input to the input apparatus 50 is received as the information input to the object V1 and reflected in the object V1 in a visible manner. In FIG. 6B, an input operation is performed on the software keyboard displayed so as to be superimposed on the input apparatus 50 that is visible through the HMD 30, but the input operation may be performed on the software keyboard displayed on the display unit of the input apparatus 50.

In a case where the input operation on the input apparatus 50 by the user U is completed, the user U presses the end button B1 illustrated in FIG. 6B by gesture. Then, as illustrated in FIG. 6C, the object V1 and the input apparatus 50, which are in contact and cooperate with each other, are separated from each other. This makes the object V1 and the input apparatus 50 cooperate with each other, and the software keyboard displayed so as to be superimposed on the input apparatus 50 disappears. Further, the input information is reflected in the object V1 and displayed in a visible manner.

The method of separating and making the object V1 and the input apparatus 50, which are in contact and cooperate with each other, enter a non-cooperative state is not limited to the method of pressing the end button B1. For example, even in a case where by the gesture of the user U, an operation of grasping the object V1 that is in contact and cooperates with the input apparatus 50 and moving the object V1 as it is to be separated from the input apparatus 50, the object V1 and the input apparatus 50 can enter a non-cooperative state.

Figure 7C:
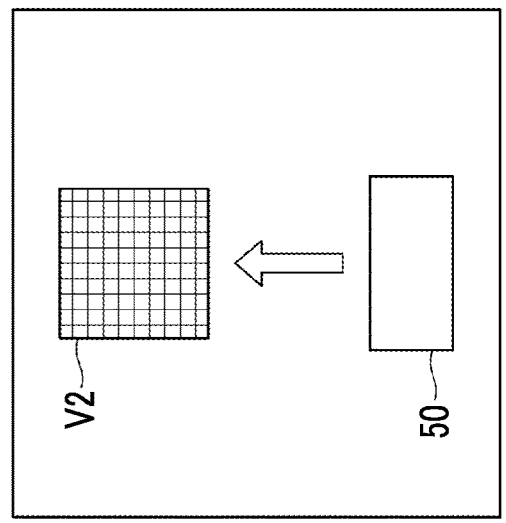
FIGS. 7A to 7C are diagrams illustrating an example of a case where the object is a Portable Document Format (PDF) document and the input apparatus is a pen tablet having no display function, as the specific example of the object and the input apparatus that are visible to the user through the HMD.
Figure 7B:
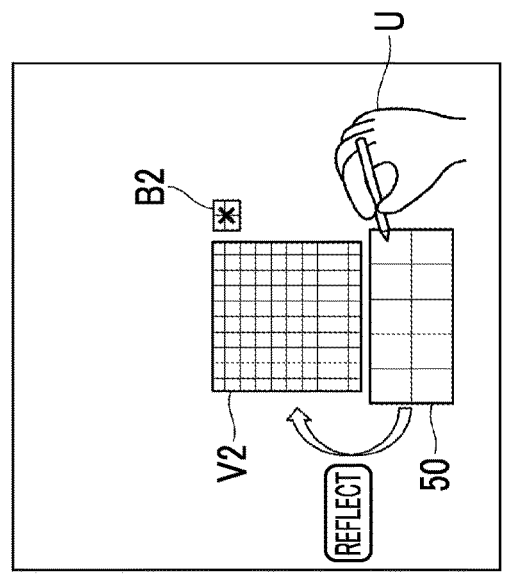
Figure 7A:
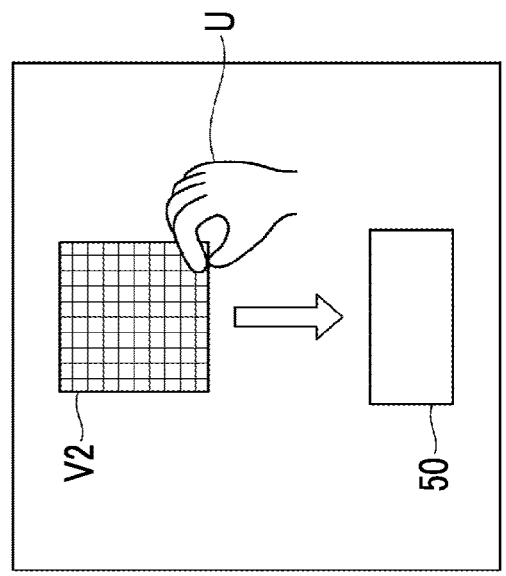

FIGS. 7A to 7C illustrate an example of a case where the object V2 visible through the HMD 30 is a PDF document and the input apparatus 50 is a pen tablet having no display function. FIG. 7A illustrates a state in which the object V2 and the input apparatus 50, which are visible through the HMD 30, are separated from each other and do not cooperate with each other. Here, in a case where, as a gesture of the user U, the user U performs an operation of grasping the object V2 and moving the object V2 as it is to be brought into contact with the input apparatus 50, the contact between the object V2 and the input apparatus 50 is detected.

In a case where the contact between the object V2 and the input apparatus 50 is detected as a result of the gesture of the user U, as illustrated in FIG. 7B, the object V2 and the input apparatus 50 enter a state of being in contact with each other, that is, a cooperative state. Then, the portion of the PDF document to be edited is enlarged and displayed so as to be superimposed on the input apparatus 50 which is in a visible state through the HMD 30. Thus, the user U can draw by hand with a stylus as an input operation for the enlarged display portion.

Then, in a case where the user U draws by hand with a stylus as an input operation on the input apparatus 50 present in the real space while looking at the enlarged display portion so as to be superimposed on the input apparatus 50, the input operation is linked to the input operation of the object V2. Thus, the information input to the input apparatus 50 is received as the information input to the object V2 and reflected in the object V2 in a visible manner.

In a case where the input operation to the input apparatus 50 by the user U is completed, the user U presses the end button B2 illustrated in FIG. 7B with a stylus by gesture. Then, as illustrated in FIG. 7C, the object V2 and the input apparatus 50, which are in contact and cooperate with each other, are separated from each other. Thus, the object V2 and the input apparatus 50 enter a non-cooperative state, and the enlarged and displayed portion so as to be superimposed on the input apparatus 50 disappears. Further, the input information is displayed in the object V2 in a visible manner.

The method of separating and making the object V2 and the input apparatus 50, which are in contact and cooperate with each other, enter a non-cooperative state is not limited to the method of pressing the end button B2. For example, even in a case where by the gesture of the user U, an operation of grasping the object V2 that is in contact and cooperates with the input apparatus 50 and moving the object V2 as it is to be separated from the input apparatus 50, the object V2 and the input apparatus 50 can enter a non-cooperative state.

Figure 8C:
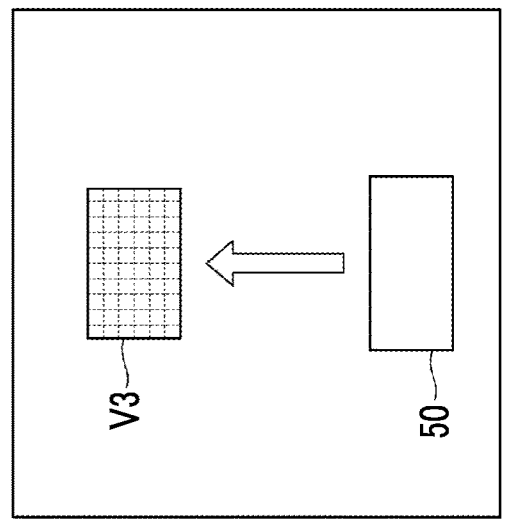
FIGS. 8A to 8C are diagrams illustrating an example of a case where the object is an object that can receive an input operation for drawing by a stylus and can be shared with other users, and the input apparatus is a tablet terminal, as the specific example of the object and the input apparatus that are visible to the user through the HMD.
Figure 8B:
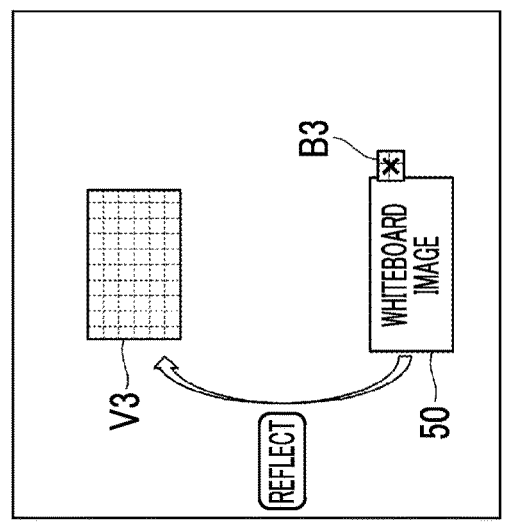
Figure 8A:
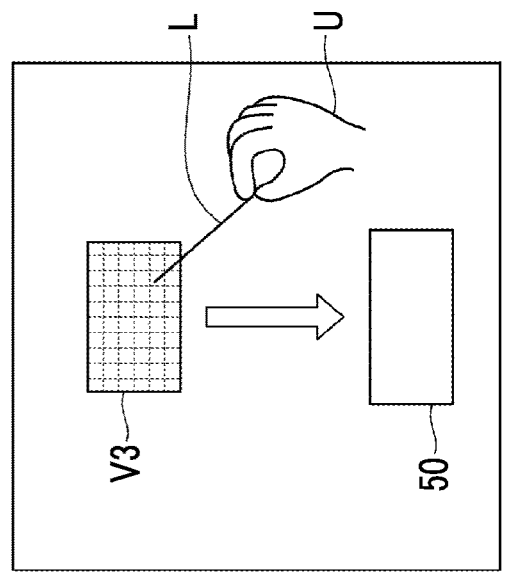

FIGS. 8A to 8C illustrate an example of a case where the object V3 that is visible through the HMD 30 is the object that can receive an input operation for drawing by a stylus and can be shared with other users U (hereinafter referred to as "white board") and the input apparatus 50 is a tablet terminal. FIG. 8A illustrates a state in which the object V3 and the input apparatus 50, which are visible through the HMD 30, are separated from each other and do not cooperate with each other. Here, in a case where, as a gesture of the user U, the object V3 is indicated by the pointer L displayed by the picking operation and an operation of moving the object V3 as it is to be brought into contact with the input apparatus 50, the contact between the object Ve and the input apparatus 50 is detected.

In a case where the contact between the object V3 and the input apparatus 50 is detected as a result of the gesture of the user U, as illustrated in FIG. 8B, the object V3 returns to the original position, and the object V3 and the object V3 and the input apparatus 50 enter a cooperative state. Then, an image (whiteboard image) of the object V3 is displayed so as to be superimposed on the input apparatus 50 in a visible state through the HMD 30. Thus, the user U can draw by hand with a stylus as an input operation for the image of the displayed object V3.

Then, in a case where the user U draws by hand with a stylus as an input operation for the input apparatus 50 present in the real space while looking at the image of the object V3 displayed so as to be superimposed on the input apparatus 50, the input operation is linked to the input operation of the object V3. Thus, the information input to the input apparatus 50 is received as the information input to the object V3 and reflected in the object V3 in a visible manner.

In a case where the input operation to the input apparatus 50 by the user U is completed, the user U presses the end button B3 illustrated in FIG. 8B with a stylus by gesture. Then, the object V3 and the input apparatus 50 do not cooperate with each other, and as illustrated in FIG. 8C, the image (whiteboard image) of the object V3 displayed so as to be superimposed on the input apparatus 50 disappears. Further, the input information is displayed in the object V3 in a visible manner.

The method of separating and making the object V3 and the input apparatus 50, which are in contact and cooperate with each other, enter a non-cooperative state is not limited to the method of pressing the end button B3. For example, even in a case where by the gesture of the user U, an operation of indicating the object V3 that is in contact and cooperates with the input apparatus 50 by the pointer L and moving the object V3 as it is to be separated from the input apparatus 50 is performed, the object V3 and the input apparatus 50 enter a non-cooperative state.

FIGS. 9A to 9C illustrate an example of a case where the object V4 that is visible through the HMD 30 is a software keyboard and the input apparatus 50 is a tablet terminal. FIG. 9A shows a state in which the object V4 and the input apparatus 50, which are visible through the HMD 30, are separated from each other and do not cooperate with each other. In FIG. 9A, the object V5, in which the information input to the object V4 is reflected, is visible through the HMD 30. Here, in a case where, as a gesture of the user U, the user U performs an operation of grasping the object V4 and moving the object V4 as it is to be brought into contact with the input apparatus 50, the contact between the object V4 and the input apparatus 50 is detected.

In a case where the contact between the object V4 and the input apparatus 50 is detected as a result of the gesture of the user U, as illustrated in FIG. 9B, the object V4 as the software keyboard disappears, and a software keyboard is displayed so as to be superimposed on the input apparatus 50 which is in a visible state through the HMD 30. Further, the object V6 as another object appears so as to come into contact with the input apparatus 50. Input fields and conversion candidates are displayed in the object V6. Therefore, the user U can perform an input operation on the software keyboard displayed so as to be superimposed on the input apparatus 50 while looking at the input fields and the conversion candidates displayed on the object V6.

In a case where the user U performs an input operation on the software keyboard while looking at the input fields and the conversion candidates displayed on the object V6, the input information is received as the information input on the object V5. Then, it is reflected in the object V5 in a visible manner. In FIG. 9B, an input operation is performed on the software keyboard displayed so as to be superimposed on the input apparatus 50, but the input operation may be performed on the software keyboard actually displayed on the input apparatus 50.

In a case where the input operation on the input apparatus 50 by the user U is completed, the user U presses the end button B4 illustrated in FIG. 9B by gesture. Then, as illustrated in FIG. 9C, the object V6 disappears, the object V6 and the input apparatus 50 do not cooperate with each other, and the software keyboard displayed so as to be superimposed on the input apparatus 50 disappears. Further, the information input through the software keyboard is displayed on the object V5 in a visible manner.

The method of separating and making the object V6 and the input apparatus 50, which are in contact and cooperate with each other, enter a non-cooperative state is not limited to the method of pressing the end button B4. For example, even in a case where by the gesture of the user U, an operation of grasping the object V4 that is in contact and cooperates with the input apparatus 50 and moving the object V4 as it is to be separated from the input apparatus 50 is performed, the object V4 and the input apparatus 50 enter a non-cooperative state.

Figure 10C:
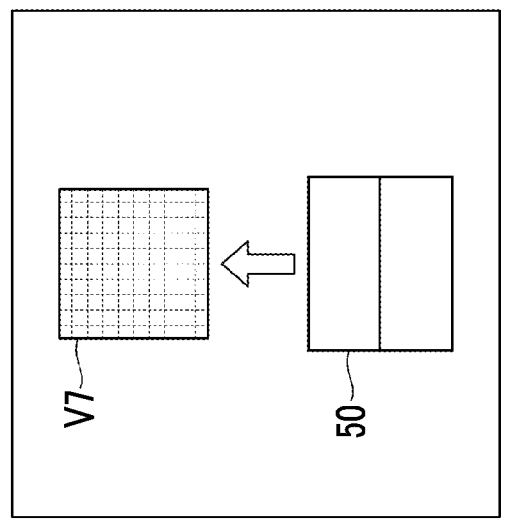
FIGS. 10A to 10C are diagrams illustrating an example of a case where the object is a three-dimensional model capable of receiving an input for editing by three-dimensional model design software and the input apparatus is a notebook type personal computer, as the specific example of the object and the input apparatus that are visible to the user through the HMD.
Figure 10B:
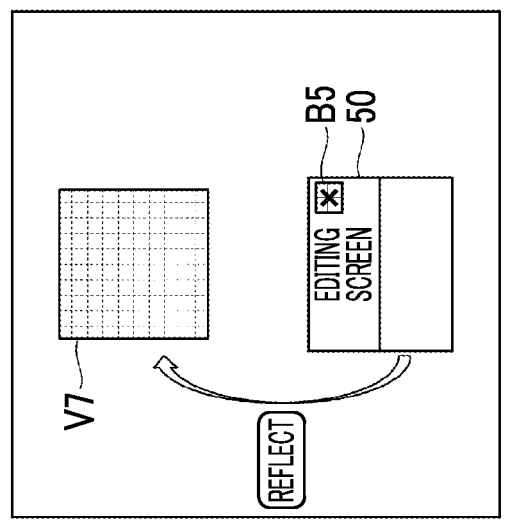
Figure 10A:
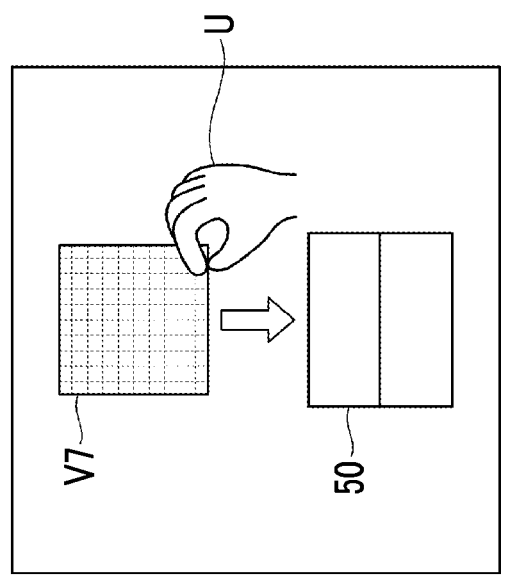

FIGS. 10A to 10C illustrate an example of a case where the object V7 that is visible through the HMD 30 is a three-dimensional model capable of receiving an input for editing by three-dimensional model design software and the input apparatus 50 is a notebook type personal computer. FIG. 10A illustrates a state in which the object V7 and the input apparatus 50, which are visible through the HMD 30, are separated from each other and do not cooperate with each other. Here, in a case where, as a gesture of the user U, the user U performs an operation of grasping the object V7 and moving the object V7 as it is to be brought into contact with the input apparatus 50, the contact between the object V7 and the input apparatus 50 is detected.

In a case where the contact between the object V7 and the input apparatus 50 is detected as a result of the gesture of the user U, as illustrated in FIG. 10B, the object V7 returns to the original position, and an editing screen of a three-dimensional model is displayed on the display unit of the input apparatus 50 which is in a visible state through the HMD 30. Thus, the user U can perform an input operation for editing the object V7, which is a three-dimensional model, while looking at the editing screen of the three-dimensional model that is visible through the HMD 30. In a case where the user U performs an input operation for editing the three-dimensional model while looking at the editing screen of the three-dimensional model, the three-dimensional model reflecting the input information is displayed as the object V7.

In a case where the input operation for the input apparatus 50 by the user U is completed, the user U presses the end button B5 illustrated in FIG. 10B by gesture. Then, as illustrated in FIG. 10C, the object V7 and the input apparatus 50 enter a non-cooperative state, and the editing screen of the three-dimensional model displayed on the display unit of the input apparatus 50 disappears. Further, the three-dimensional model reflecting the information input for editing the three-dimensional model is displayed as the object V7 in a visible manner.

Figure 11C:
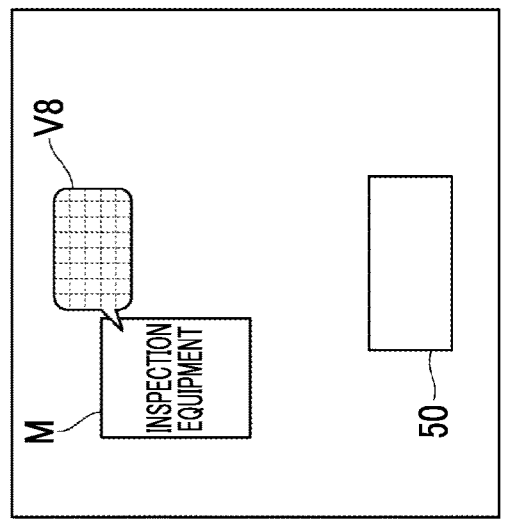
FIGS. 11A to 11C are diagrams illustrating an example of a case where the object is a balloon capable of receiving text input and the input apparatus is a tablet terminal, as the specific example of the object and the input apparatus that are visible to the user through the HMD.
Figure 11B:
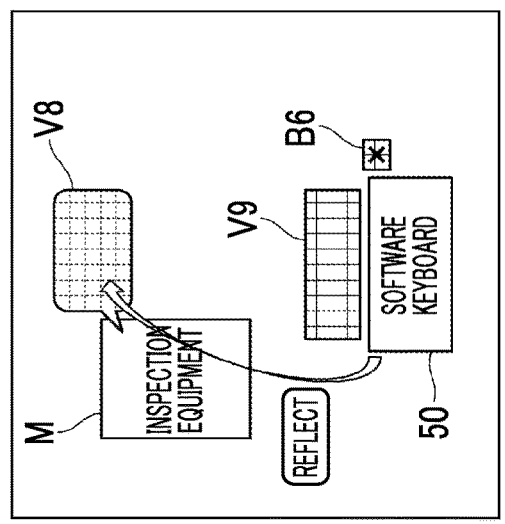
Figure 11A:
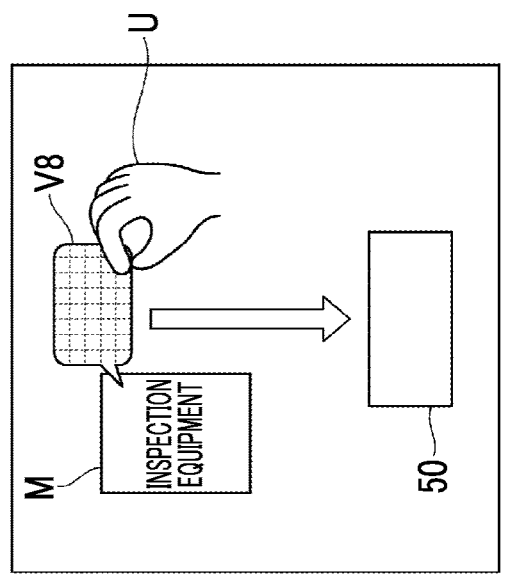

FIGS. 11A to 11C illustrate an example of a case where the object V8 visible through the HMD 30 is a balloon capable of receiving text input and the input apparatus 50 is a tablet terminal. The balloons illustrated in FIGS. 11A to 11C are balloons displayed for contact to the inspection equipment in the real space that is visible through the HMD 30 or displayed in the vicinity of the inspection equipment. In this balloon, information indicating the inspection equipment itself, information indicating the content of the inspection, information obtained from the inspection equipment, and the like are displayed in an editable manner. FIG. 11A illustrates a state in which the object V8 and the input apparatus 50, which are visible through the HMD 30, are separated from each other and do not cooperate with each other. Here, in a case where, as a gesture of the user U, the user U performs an operation of grasping the object V8 and moving the object V8 as it is to be brought into contact with the input apparatus 50, the contact between the object V8 and the input apparatus 50 is detected.

In a case where the contact between the object V8 and the input apparatus 50 is detected as a result of the gesture of the user U, as illustrated in FIG. 11B, the object V8 returns to the original position, and a software keyboard is displayed so as to be superimposed on the input apparatus 50 which is in a visible state through the HMD 30. Further, the object V9 as another object appears so as to come into contact with the input apparatus 50. Input fields and conversion candidates are displayed in the object V9. Thus, the user U can perform an input operation on the software keyboard displayed so as to be superimposed on the input apparatus 50 while looking at the input fields and the conversion candidates displayed on the object V9.

In a case where the user U performs an input operation on the software keyboard while looking at the input fields and the conversion candidates displayed on the object V9, the input information is received as the information input on the object V9, and is reflected in the object V8 in a visible manner. In FIG. 11B, an input operation is performed on the software keyboard displayed so as to be superimposed on the input apparatus 50, but the input operation may be performed on the software keyboard actually displayed on the input apparatus 50.

In a case where the input operation on the input apparatus 50 by the user U is completed, the user U presses the end button B6 illustrated in FIG. 11B by gesture. Then, as illustrated in FIG. 11C, the object V9 disappears, the object V9 and the input apparatus 50 do not cooperate with each other, and the software keyboard displayed so as to be superimposed on the input apparatus 50 disappears. Further, the information input through the software keyboard is displayed on the object V8 in a visible manner.

The method of making the object V8 and the input apparatus 50, which cooperate with each other, enter a non-cooperative state is not limited to the method of pressing the end button B6. For example, even in a case where by the gesture of the user U, an operation of grasping the object V9 in a state of being in contact with the input apparatus 50 and moving the object V9 as it is to be separated from the input apparatus 50, the object V9 and the input apparatus 50 can enter a non-cooperative state.

Although the present exemplary embodiment has been described above, the present invention is not limited to the above-described exemplary embodiment. Further, the effect of the present invention is not limited to the effect described in the above-described exemplary embodiment of the present invention. For example, the system configuration shown in FIG. 1 and the hardware configurations shown in FIG. 2 are only examples for achieving the object of the present invention, and are not particularly limited. Further, the functional configuration shown in FIG. 3 is only an example, and is not particularly limited. As long as the information processing system 1 in FIG. 1 is provided with a function capable of executing the above-described processes as a whole, a functional configuration used to implement this function is not limited to the example of FIG. 3.

Further, the order of the processing steps illustrated in FIGS. 4 and 5 is only an example, and is not particularly limited. Not only the processes performed in chronological order according to the order of the illustrated steps, but also the processes may not necessarily be performed in chronological order, but may be performed in parallel or individually. Further, the specific examples illustrated in FIGS. 6A to 11C are only examples, and are not particularly limited.

Further, for example, in FIGS. 6A to 11C, the object is brought into contact with the input apparatus 50 by grasping or indicating the object as a gesture of the user U, but the present invention is not limited to this. Since the object and the input apparatus 50 only need to come into contact with each other, the input apparatus 50 in the real space may be moved to come into contact with the object, as a gesture of the user U. Specifically, the user U moves the input apparatus 50 held in his hand to bring the input apparatus 50 into contact with the object displayed on the HMD 30. In this case, the contact detection unit 107 (see FIG. 3) of the HMD 30 detects that the contact between the object and the input apparatus 50 is based on the intentional operation (in this case, gesture) of the user U.

Further, for example, in the above-described exemplary embodiment, the transparent type HMD30 is adopted, but the non-transparent type HMD30 may be adopted. That is, in the present invention, since it is sufficient for the user to visually recognize the object and the input apparatus through the display device, for example, the captured image of the input apparatus may be displayed in real time on the non-transparent HMD.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor configured to:
   perform control for causing a virtual object and an input apparatus present in a real space that are capable of receiving an information input operation to be visible through a display device;
   detect contact between the virtual object and the input apparatus, based on information regarding respective positions of the virtual object and the input apparatus that are visible through the display device by determining whether the virtual object is superimposed on a part of the input apparatus;
   receive information input to the input apparatus, as information input to the virtual object, in a case where the contact is detected;
   detect separation between the virtual object and the input apparatus that are in contact with each other, based on information regarding the position of each of the virtual object and the input apparatus; and
   in a case where the separation is detected, even in a case where information is input to the input apparatus, not receive the information as the information input to the virtual object.

2. The information processing apparatus according to claim 1, wherein the processor is configured to:
   perform control for causing the input apparatus present in the real space to be visible through the display device.

3. The information processing apparatus according to claim 2, wherein the processor is configured to:
   specify the input apparatus that is a target of an input operation of a user, among the input apparatuses present in the real space, and perform control for causing the input apparatus to be visible through the display device.

4. The information processing apparatus according to claim 3, wherein the processor is configured to:
   specify the input apparatus that is the target of the input operation of the user, and control the input apparatus to be visible through the display device, based on a behavior of the input apparatus, estimated from any one or more data pieces, among data provided by the input apparatus, image data obtained by imaging the input apparatus, and sensing data targeting the input apparatus.

5. The information processing apparatus according to claim 4, wherein the processor is configured to:
   specify the input apparatus that is the target of the input operation of the user, and perform control for causing the input apparatus to be visible through the display device, based on the behavior of the input apparatus, estimated from a collation result between inertial measurement data (IMU data) of the input apparatus and three-dimensional behavior data.

6. The information processing apparatus according to claim 1, wherein the processor is configured to:
perform control for causing the virtual object and the input apparatus that are capable of receiving the input operation of any one or more types of information among text information, audio information, and image information, to be visible through the display device.

7. The information processing apparatus according to claim 6, wherein the processor is configured to:
perform control for causing another virtual object that supports the input operation to the input apparatus to be further visible, as the control for causing the virtual object and the input apparatus that are capable of receiving the input operation of the one or more types of information to be visible through the display device.

8. The information processing apparatus according to claim 7, wherein the processor is configured to:
perform control for causing the other virtual object to be visible such that the other virtual object is superimposed on a vicinity of the input apparatus or at least a part of the input apparatus.

9. The information processing apparatus according to claim 1, wherein the processor is configured to:
detect contact between the virtual object and the input apparatus, based on information indicating respective outer edges of the virtual object and the input apparatus that are visible through the display device, as information regarding the position.

10. The information processing apparatus according to claim 9, wherein the processor is configured to:
detect contact between outer edges of virtual areas surrounding the outer edges, which are specified from the information indicating the respective outer edges of the virtual object and the input apparatus, as the contact between the virtual object and the input apparatus.

11. The information processing apparatus according to claim 10,
wherein the outer edges of the virtual areas are specified based on values predetermined as values of distances from the respective outer edges of the virtual object and the input apparatus to an outside.

12. The information processing apparatus according to claim 1, wherein the processor is configured to:
in a case where the detected contact is based on a user's intentional operation, receive information input to the input apparatus, as information input to the virtual object.

13. The information processing apparatus according to claim 12, wherein the processor is configured to:
in a case where the detected contact is due to an operation of moving the virtual object to come into contact with the input apparatus or an operation of moving the input apparatus to come into contact with the virtual object, by a gesture of the user, assume that the contact is based on the intentional operation of the user, and receive the information input to the input apparatus as the information input to the virtual object.

14. The information processing apparatus according to claim 12, wherein the processor is configured to:
in a case where a user's line of sight is at or near a contact point between the virtual object and the input apparatus at a timing of the contact, assume that the contact is based on the intentional operation of the user, and receive the information input to the input apparatus as the information input to the virtual object.

15. The information processing apparatus according to claim 1, wherein the processor is configured to:
receive information input to the input apparatus by an input function for performing the input operation specified based on a combination of a type of the virtual object and a function of the input apparatus, as information input to the virtual object.

16. The information processing apparatus according to claim 15, wherein the processor is configured to:
specify the function of the input apparatus, based on any one or more data pieces, among data provided by the input apparatus, image data obtained by imaging the input apparatus, and sensing data targeting the input apparatus.

17. The information processing apparatus according to claim 1, wherein the processor is configured to:
in a case where the detected separation is based on a user's intentional operation, even in a case where information is input to the input apparatus, not receive the information as the information input to the virtual object.

18. An information processing system comprising:
a display control unit that performs control for causing a virtual object and an input apparatus present in a real space that are capable of receiving an information input operation to be visible through a display device;
a detection unit that detects contact between the virtual object and the input apparatus, based on information regarding respective positions of the virtual object and the input apparatus that are visible through the display device by determining whether the virtual object is superimposed on a part of the input apparatus; and
a reception unit that receives information input to the input apparatus, as information input to the virtual object, in a case where the contact is detected,
wherein the detection unit detects separation between the virtual object and the input apparatus that are in contact with each other, based on information regarding the position of each of the virtual object and the input apparatus, and
wherein in a case where the separation is detected, even in a case where information is input to the input apparatus, the reception unit does not receive the information as the information input to the virtual object.

19. A non-transitory computer readable medium storing a program implementing:
a function of performing control for causing a virtual object and an input apparatus present in a real space that are capable of receiving an information input operation to be visible through a display device;
a function of detecting contact between the virtual object and the input apparatus, based on information regarding respective positions of the virtual object and the input apparatus that are visible through the display device by determining whether the virtual object is superimposed on a part of the input apparatus;
a function of receiving information input to the input apparatus, as information input to the virtual object, in a case where the contact is detected;
a function of detecting separation between the virtual object and the input apparatus that are in contact with each other, based on information regarding the position of each of the virtual object and the input apparatus; and
a function of, in a case where the separation is detected, even in a case where information is input to the input apparatus, not receiving the information as the information input to the virtual object.

\* \* \* \* \*